United States Patent [19]
Szumer

[11] Patent Number: 6,029,359
[45] Date of Patent: Feb. 29, 2000

[54] POST, PIPE, AND SIGN LEVEL

[75] Inventor: Emanuel Szumer, Kibbutz Kadarim, Israel

[73] Assignee: Kapro Industries Ltd., Hakerem, Israel

[21] Appl. No.: 09/007,870

[22] Filed: Jan. 15, 1998

[30] Foreign Application Priority Data

Feb. 18, 1997 [IL] Israel ........................................ 120249

[51] Int. Cl.[7] .................................................. G01C 9/28
[52] U.S. Cl. .................................. 33/373; 33/374; 33/382; 33/465
[58] Field of Search ............................. 33/370, 371, 372, 33/373, 374, 375, 382, 451, 465, 379, 381, 383, 390

[56] References Cited

U.S. PATENT DOCUMENTS

| | | |
|---|---|---|
| 312,266 | 2/1885 | Gurley . |
| 392,124 | 10/1888 | Jackson . |
| 1,767,335 | 6/1930 | Wilcox . |
| 2,727,314 | 12/1955 | Dossie et al. . |
| 3,820,249 | 6/1974 | Stone . |
| 3,826,013 | 7/1974 | Baher . |
| 4,168,578 | 9/1979 | VanderWerf ............................. 33/382 |
| 4,343,093 | 8/1982 | Eadens . |
| 4,446,627 | 5/1984 | Persson . |
| 4,976,040 | 12/1990 | Mish et al. . |
| 5,207,004 | 5/1993 | Gruetzmacher . |
| 5,255,443 | 10/1993 | Schmidt . |

*Primary Examiner*—Andrew H. Hirshfeld
*Attorney, Agent, or Firm*—Ladas & Parry

[57] ABSTRACT

A post level including a pair of arms pivotally attached to each other at a hinge, each arm defining at least one level face for plumbing a surface, and at least one bubble vial mounted on at least one of the arms on a surface generally opposite to the at least one level face, wherein the arms may be swung about the hinge so as to be positioned generally parallel with each other with the at least one bubble vial being between the arms.

8 Claims, 3 Drawing Sheets

POST, PIPE, AND SIGN LEVEL

FIELD OF THE INVENTION

The present invention relates to spirit levels in general, and particularly to a level which may be used to plumb posts and pipes of any shape and to set signs affixed to the posts or pipes, or affixed to walls.

BACKGROUND OF THE INVENTION

Spirit or bubble levels used to plumb vertical posts, pipes or poles are well known. For example, an early U.S. Pat. No. 392,124 to Jackson describes a spirit level attachable to a vertical post with screws. U.S. Pat. No. 3,826,013 to Baher describes a post level with right-angular arms adapted to engage a circumferential surface of a post. The post level is hand-held against the post and bubble vials indicate the degree of verticality of the post.

U.S. Pat. No. 2,727,314 to Dossie et al. describes a post level which allows plumbing both sides of a vertical corner post simultaneously. This device uses an extended plumbing surface with mirrors to view the bubble vials.

U.S. Pat. No. 5,207,004 to Gruetzmacher describes a post level defined by a pair of right-angle, non-hinged, rigid walls. A horizontal bubble vial is mounted in each wall, and a vertical bubble vial is mounted at the intersection of the walls.

U.S. Pat. No. 4,976,040 to Mish et al. describes a post level with a pair of columnar level bodies attachable to a post with elastic bands.

U.S. Pat. No. 4,343,093 to Eadens describes a post level including a pair of right-angle hinged arms with an orbital bubble vial, known as a "bull's-eye type" bubble vial, mounted on one of the arms. A chain may be wrapped around a post to attach the level thereto.

SUMMARY OF THE INVENTION

The present invention seeks to provide a novel level which may serve as a post, pipe and sign level. In other words, the level of the present invention may be used to plumb any vertical pole or post of any arbitrary cross section (circular, rectangular, triangular, irregular, oversize, etc.) and may also be used to horizontally set an object. The level is thus particularly useful to persons installing road signs on posts, because the level can be used not only to plumb the verticality of the post but can also be used to horizontally set the road sign affixed to the post. The level has hinged arms which may be folded into a compact size for storage and transport thereof Bubble vials are mounted on the arms, and the arms fold inwards so that the bubble vials are protected by the structure of the arms. The arms may be spread out 180° and the level used as a conventional bubble level. A strap, magnetic surface or other device is provided for attaching the level to the post, pipe, or sign.

There is thus provided in accordance with a preferred embodiment of the present invention, a post level including a pair of arms pivotally attached to each other at a hinge, each arm defining at least one level face for plumbing a surface, and at least one bubble vial mounted on at least one of the arms on a surface generally opposite to the at least one level face, wherein the arms may be swung about the hinge so as to be positioned generally parallel with each other with the at least one bubble vial being between the arms.

In accordance with a preferred embodiment of the present invention, an auxiliary bubble vial is attached along the hinge, the auxiliary bubble vial being generally perpendicular to the at least one bubble vial.

Additionally in accordance with a preferred embodiment of the present invention, the hinge is formed with at least one indent mechanism so as to permit positioning the arms at a predetermined angle relative to each other.

Further in accordance with a preferred embodiment of the present invention, the post level includes an attachment device for attaching the level to an object to be plumbed. The attachment device may be a strap, magnetic surface, elastic band, and/or multiple hook fastener.

Still further in accordance with a preferred embodiment of the present invention, each arm includes at least two generally mutually perpendicular level faces for plumbing surfaces.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
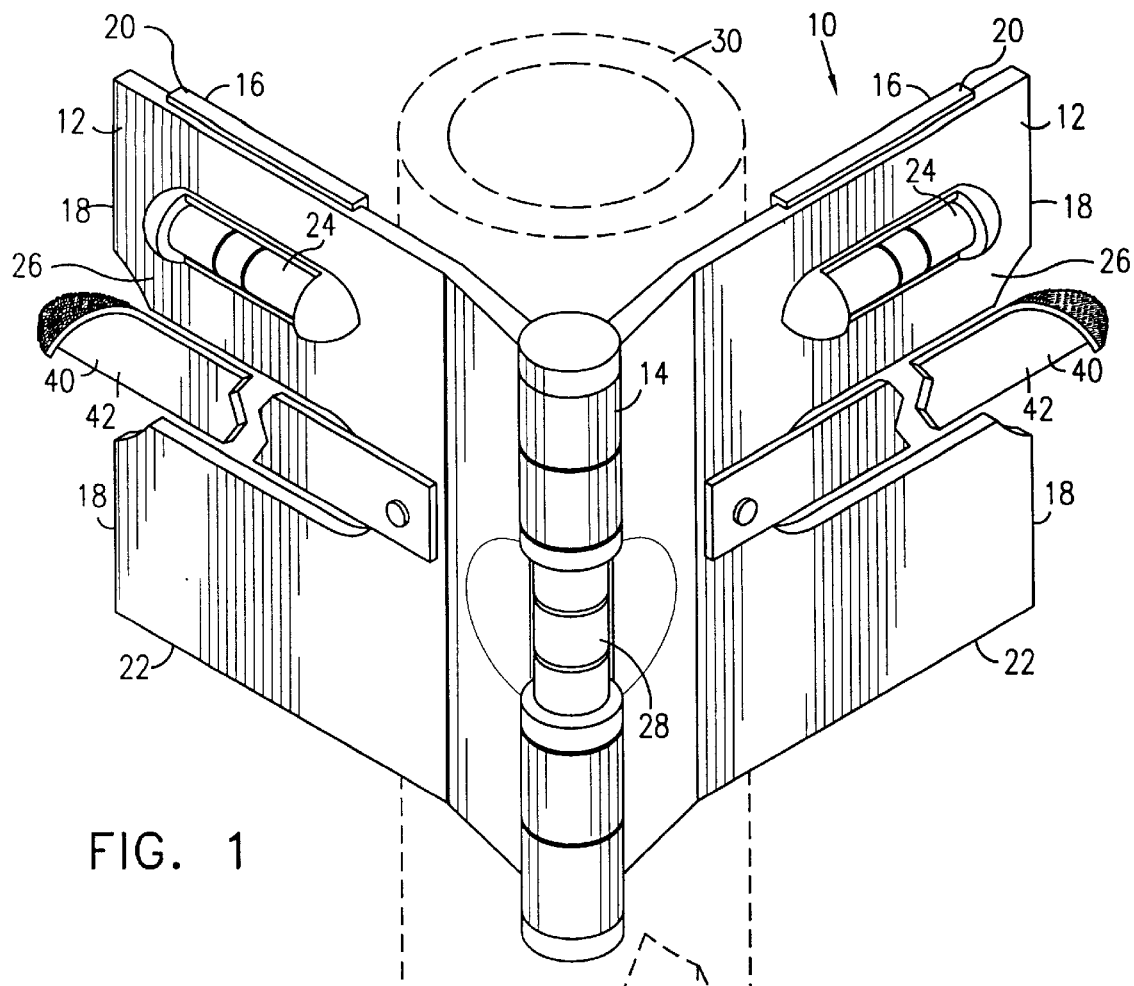
FIG. 1 is a simplified pictorial illustration of a post level, constructed and operative in accordance with a preferred embodiment of the present invention.
Figure 2:
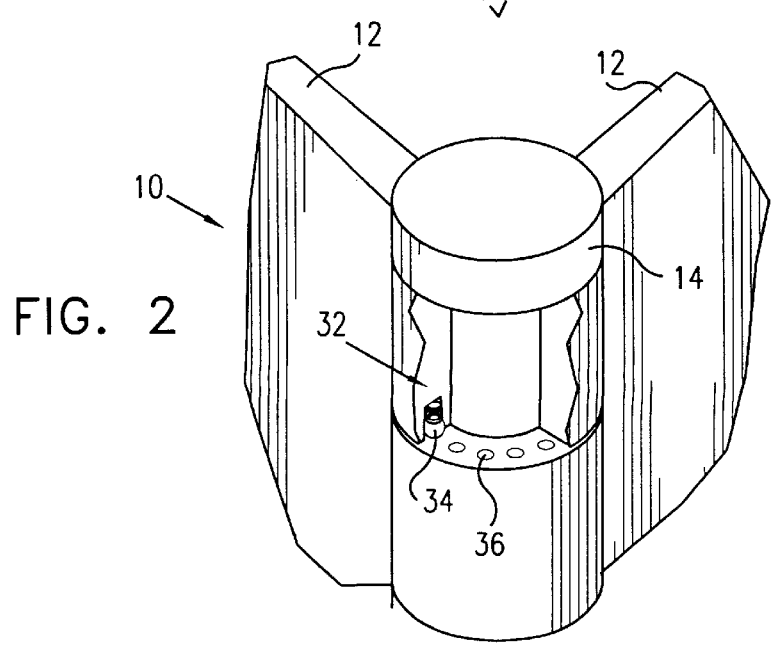
FIG. 2 is a simplified, partially cutaway illustration of a portion of the post level of FIG. 1, showing an indent mechanism in a hinge.
Figure 3:
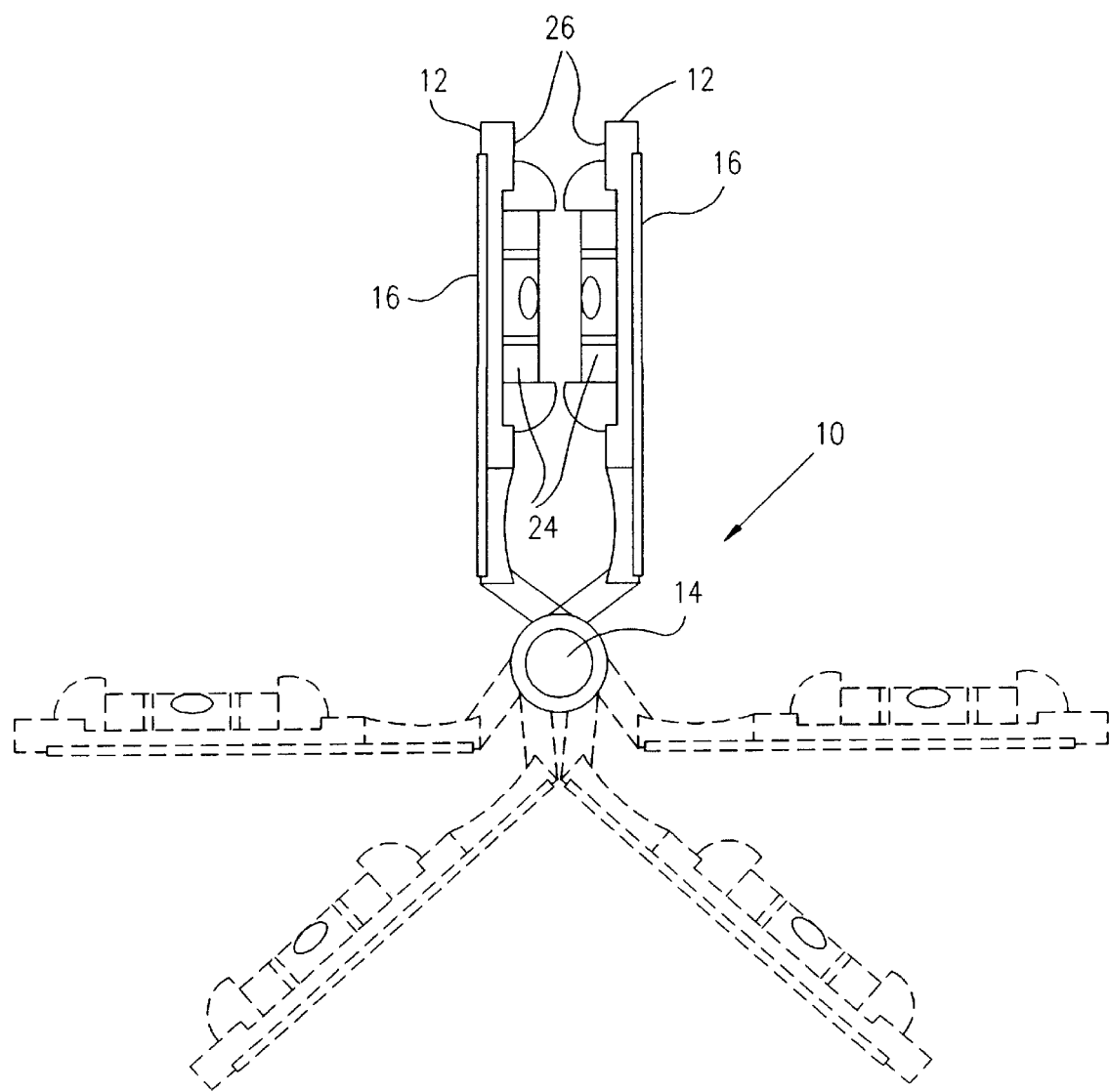
FIG. 3 is a simplified top view illustration of the post level of FIG. 1.

Reference is now made to FIGS. 1, 2 and 3 which illustrate a post level 10, constructed and operative in accordance with a preferred embodiment of the present invention. Post level 10 preferably includes a pair of arms 12 pivotally attached to each other at a hinge 14, and preferably made of a mechanically stable and durable metal alloy or plastic. Each arm 12 defines at least one level face 16 for plumbing a surface, level face 16 typically having an accurate flatness and smoothness. Preferably each arm defines a plurality of mutually perpendicular level faces 18, 20 and 22, which are also mutually perpendicular to level face 16.

At least one bubble vial 24 is mounted on at least one of the arms 12 on a surface 26 generally opposite to level face 16. Most preferably, one bubble vial 24 is mounted on each arm 12. As seen in FIG. 3, arms 12 may be swung about hinge 14 so as to be positioned generally parallel with each other with bubble vials 24 being between arms 12. Thus, when arms 12 are completely folded, bubble vials 24 are protected from damage caused by inadvertent physical strikes thereto, and post level 10 may be conveniently carried about and/or stored. Arms 12 may be spread out 180° so that post level 10 may be used as a conventional bubble level, such as for leveling a thin flat surface, as described hereinbelow with reference to FIG. 4.

Preferably, an auxiliary bubble vial 28 is attached along hinge 14 generally perpendicular to bubble vials 24. As seen in FIG. 1, a vertical post or pipe 30 may be plumbed by observing bubble vials 24. Post 30 may be of any arbitrary cross section, such as circular, rectangular, triangular, irregular, oversize, etc.

In accordance with a preferred embodiment of the present invention, as seen in FIG. 2, hinge 14 is formed with at least one indent mechanism 32 so as to permit positioning arms 12 at a predetermined angle relative to each other. Indent mechanism 32 may, for example, comprise a spring-loaded ball bearing 34 which selectively engages one or more dimples 36 formed in hinge 14.

Post level 10 preferably includes an attachment device 40 for attaching level 10 to post 30. Attachment device 40 may be, for example, a strap 42 which may comprise an elastic band and/or a multiple hook fastener, such as a VELCRO strip. Alternatively or additionally, a portion of post level 10, preferably level face 16, may be magnetic.

Figure 4:
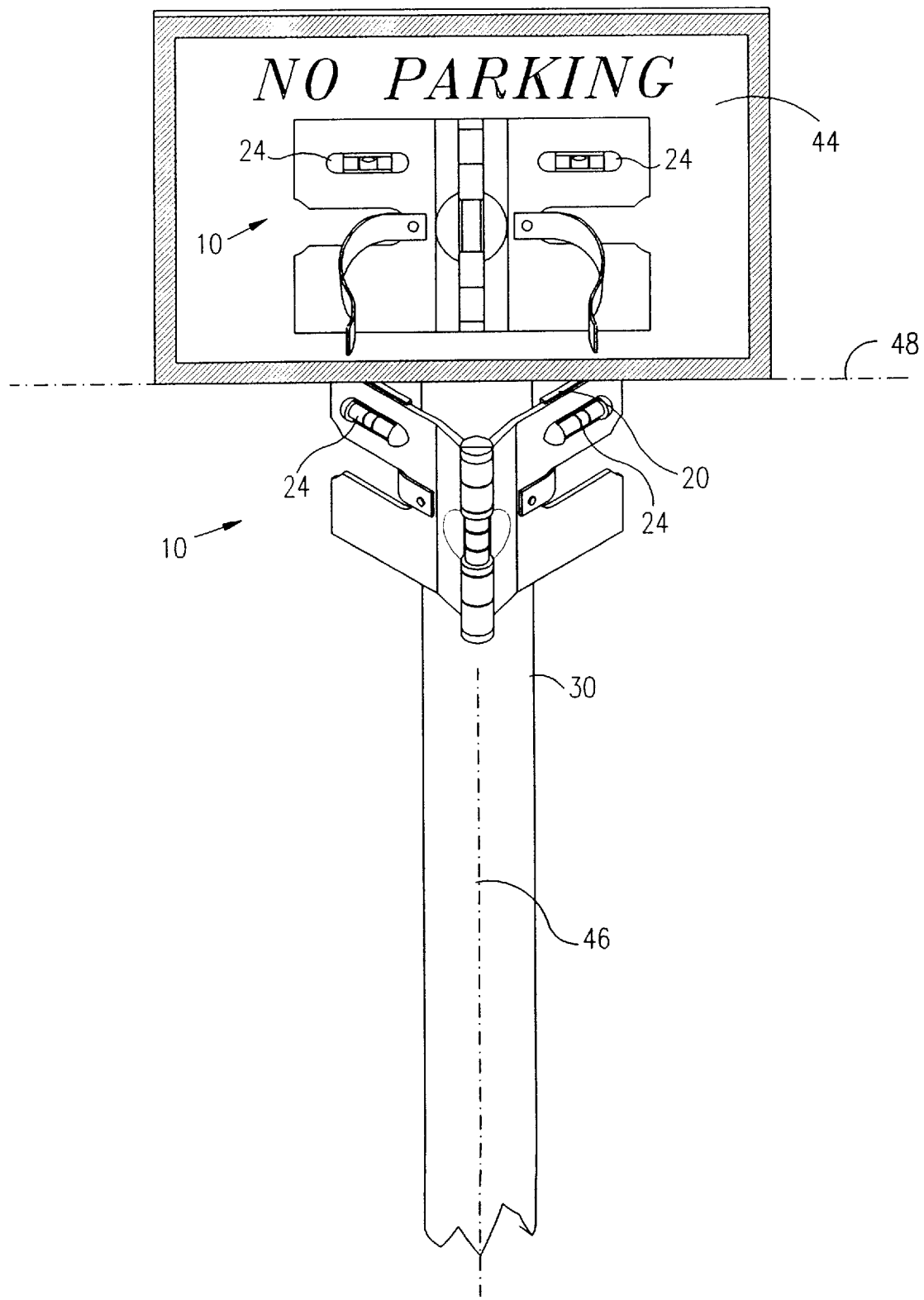
FIG. 4 is a simplified pictorial illustration of the post level of FIG. 1 being used to vertically plumb a post and horizontally set a sign on the vertical post.

Reference is now made to FIG. 4 which illustrates post level 10 being used to vertically plumb the post 30 and horizontally set a sign 44 on the vertical post 30. Post level 10 is attached to post 30 by means of attachment device 40. As previously described hereinabove, post 30 may be vertically plumbed with respect to a vertical axis 46 by observing bubble vials 24. Afterwards, sign 44 may be horizontally set with respect to a horizontal axis 48 by spreading arms 12 out 180° and magnetically attaching post level 10 to a flat surface of sign 44 and observing bubble vials 24. Alternatively, sign 44 may be horizontally set with respect to a horizontal axis 48 by resting sign 44 on surface 20 and observing bubble vials 24.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A post level comprising:

a pair of arms pivotally attached to each other at a hinge, each arm defining a generally planar level surface, a first edge generally perpendicular to and extending from said planar level surface, and a second edge generally perpendicular to and extending from said planar level surface and said first edge, said planar level surface and said first and second edges each having an acute flatness and smoothness;

at least one bubble vial mounted on at least one of the arms on a surface generally opposite to said planar level surface of said at least one arm; and an auxiliary bubble vial attached along a longitudinal axis of the hinge, the auxiliary bubble vial being generally perpendicular to the at least one bubble vial, the hinge being formed with at least one indent mechanism so as to permit positioning the arms at a predetermined angle relative to each other.

2. A post level according to claim 1 and comprising an attachment device for attaching the level to an object to be plumbed.

3. A post level according to claim 2 wherein the attachment device is selected from the group consisting of a strap, a magnetic surface, an elastic band, and a multiple hook fastener.

4. A post level according to claim 3 wherein each said arm includes a third level face which is generally perpendicular to said at least two generally mutually perpendicular level faces for plumbing a third surface.

5. A post level according to claim 2 wherein each said arm includes a third level face which is generally perpendicular to said at least two generally mutually perpendicular level faces for plumbing a third surface.

6. A post level according to claim 2 wherein each of said arms is formed with a gap through which passes said attachment device.

7. A post level according to claim 6 wherein said gap is open at a non-hinged face of each of said arms.

8. A post level according to claim 1 wherein each said arm includes a third level face which is generally perpendicular to said at least two generally mutually perpendicular level faces for plumbing a third surface.

\* \* \* \* \*